US012609936B2

(12) United States Patent
Baumgarte et al.

(10) Patent No.: US 12,609,936 B2
(45) Date of Patent: Apr. 21, 2026

(54) BLOCKCHAIN FOR ACCESS CONTROL

(71) Applicant: Schlage Lock Company LLC, Carmel, IN (US)

(72) Inventors: Joseph W. Baumgarte, Carmel, IN (US); Robert Martens, Carmel, IN (US); Sean Neal, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/636,624

(22) Filed: Apr. 16, 2024

(65) Prior Publication Data

US 2024/0267381 A1      Aug. 8, 2024

Related U.S. Application Data

(63) Continuation of application No. 17/534,818, filed on Nov. 24, 2021, now Pat. No. 11,962,594.

(51) Int. Cl.
H04L 9/40 (2022.01)
G06F 21/62 (2013.01)
(Continued)

(52) U.S. Cl.
CPC .......... H04L 63/10 (2013.01); G06F 21/6218 (2013.01); H04L 9/3213 (2013.01); G06F 2221/2141 (2013.01); H04L 9/50 (2022.05)

(58) Field of Classification Search
None
See application file for complete search history.

(56) References Cited

U.S. PATENT DOCUMENTS 10,652,239 B2    5/2020  Jentzsch et al.
11,821,236 B1 *  11/2023 Yee ..................... E05B 47/0002
(Continued)

FOREIGN PATENT DOCUMENTS

CN      110533807 A    12/2019
CN      111145395 A    5/2020
(Continued)

OTHER PUBLICATIONS

Liu; Fabric-iot: A Blockchain-Based Access Control System in IoT; IEEE Access; Jan. 21, 2020; pp. 18207-18218; vol. 8.
(Continued)

*Primary Examiner* — Nelson S. Giddins
(74) *Attorney, Agent, or Firm* — Taft Stettinius & Hollister LLP

(57) ABSTRACT

A method of using a blockchain in an access control environment according to one embodiment includes transmitting, by a mobile device, a request to access a passageway secured by a lock device to a first node device, wherein a plurality of node devices including the first node device store the blockchain, receiving, by the mobile device, a lock-specific access token from one of the plurality of node devices in response to validation of a blockchain transaction associated with the request received from the mobile device by the plurality of node devices, transmitting, by the mobile device, the lock-specific access token to the lock device, receiving, by the mobile device, a verification message from the lock device in response to successful authentication of the lock-specific access token, and transmitting, by the mobile device, a notification of verification to the first node device to amend the blockchain.

14 Claims, 6 Drawing Sheets

(51) Int. Cl.
H04L 9/32 (2006.01)
H04L 9/00 (2022.01)

(56) References Cited

U.S. PATENT DOCUMENTS

| | | | | |
|---|---|---|---|---|
| 2017/0243212 A1* | 8/2017 | Castinado | ............ | G06Q 20/389 |
| 2018/0135337 A1* | 5/2018 | Johnson | .............. | E05B 47/0001 |
| 2019/0268162 A1 | 8/2019 | Sahagun et al. | | |
| 2019/0371102 A1 | 12/2019 | Prostko et al. | | |
| 2019/0373472 A1 | 12/2019 | Smith et al. | | |
| 2020/0066072 A1 | 2/2020 | Galvez et al. | | |
| 2020/0258334 A1* | 8/2020 | Flynn | .................... | H04L 9/0891 |
| 2020/0314095 A1 | 10/2020 | Jentzsch et al. | | |
| 2021/0097795 A1* | 4/2021 | Manchovski | ......... | H04L 63/108 |
| 2021/0136580 A1* | 5/2021 | Bjelcevic | .............. | H04L 9/3226 |
| 2021/0201606 A1* | 7/2021 | Strömberg | ......... | G07C 9/00309 |
| 2023/0058482 A1* | 2/2023 | Baumgarte | ......... | H04W 12/084 |

FOREIGN PATENT DOCUMENTS

| | | |
|---|---|---|
| EP | 3474172 B1 | 1/2020 |
| WO | 2018126059 A1 | 7/2018 |

OTHER PUBLICATIONS

International Search Report; International Searching Authority; International Application No. PCT/US2022/050870; Jun. 26, 2023; 2 pages.

Written Opinion of the International Searching Authority; International Searching Authority; International Application No. PCT/US2022/050870; Jun. 26, 2023; 8 pages.

Zhu et al., "Autonomic Identity Framework for the Internet of Things"; Published in: 2017 International Conference on Cloud and Autonomic Computing (ICCAC); Date of Conference: Sep. 18-22, 2017; retrieved on [Apr. 18, 2023]; retrieved from the internet <URL: Https://ieeexplore.ieee.org/stampt/stamp.jsp?tp=&amumber=806055>.

Extended European Search Report; European Patent Office; European Patent Application No. 22899377.0; Dec. 13, 2024; 10 pages.

Examination Report No. 1; IP Australia; Australian Patent Application No. 2022396247; Jan. 23, 2025; 4 pages.

Chin-Tser Huang et al.; Consensus of Whom? A Spectrum of Blockchain Consensus Protocols and New Directions; 2019 IEEE International Smart Cities Conference (ISC2); Oct. 14, 2019; 8 pages.

Canadian Examination Report; Canadian Intellectual Property Office; Canadian Patent Application No. 3,239, 168; May 2, 2025; 4 pages.

Australian Examination Report No. 2; IP Australia; Australian Patent Application No. 2022396247; Aug. 7, 2025; 3 pages.

New Zealand Examination Report; New Zealand Intellectual Property Office; New Zealand Patent Application No. 811667; Feb. 23, 2026; 3 pages.

* cited by examiner

300

302 LOCK DEVICE BROADCASTS LOCK IDENTIFIER

304 MOBILE DEVICE DETECTS BROADCAST LOCK IDENTIFIER

306 ACCESS REQUEST?

END

NO

YES

308 MOBILE DEVICE SENDS LOCK IDENTIFIER AND MOBILE DEVICE IDENTIFIER TO BLOCKCHAIN NODE(S)

310 NODES VALIDATE TRANSACTION

312 VALIDATED?

END

NO

YES

314 NODES ADD TRANSACTION TO BLOCKCHAIN

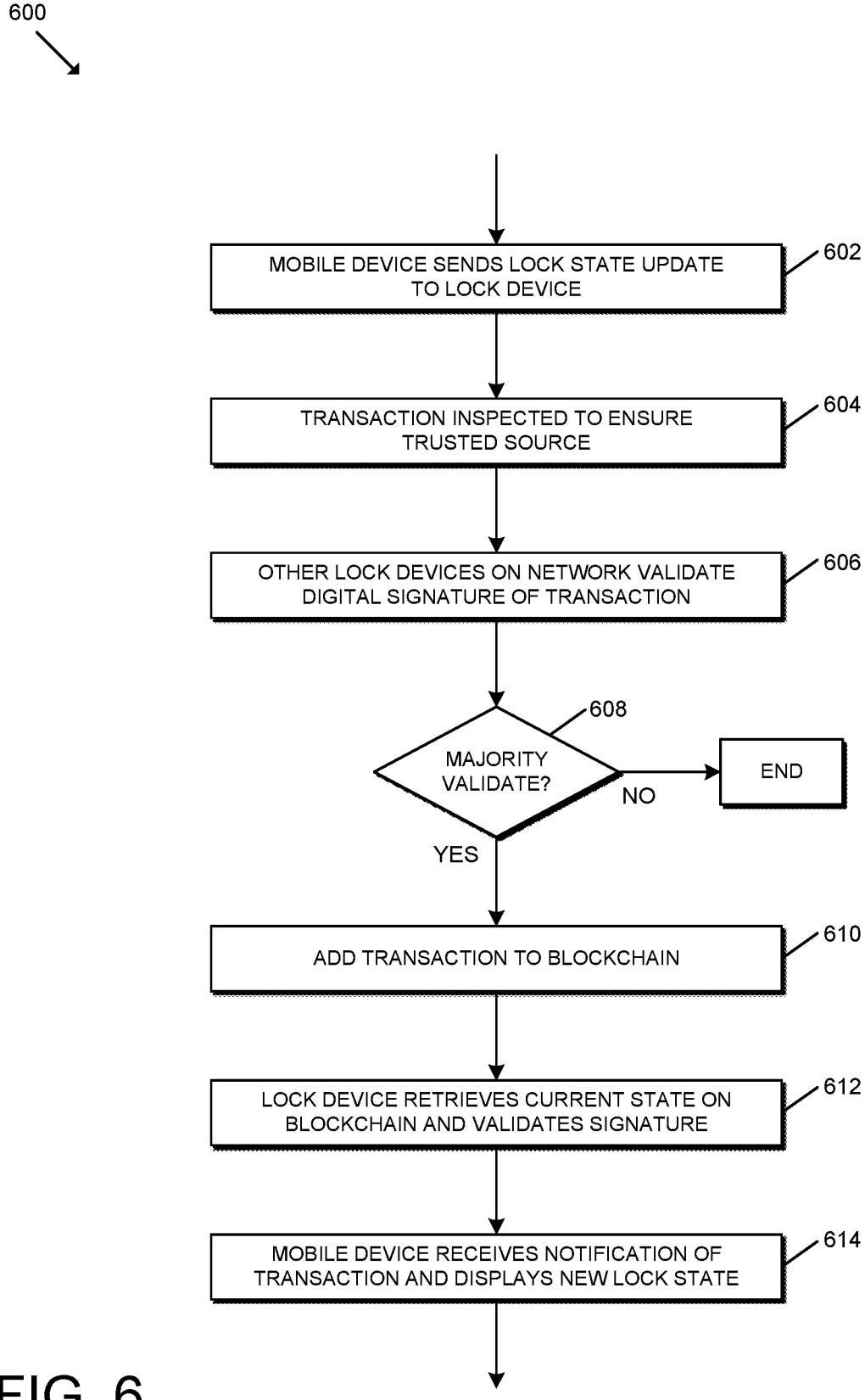

600

MOBILE DEVICE SENDS LOCK STATE UPDATE
TO LOCK DEVICE                                    602

TRANSACTION INSPECTED TO ENSURE
TRUSTED SOURCE                                    604

OTHER LOCK DEVICES ON NETWORK VALIDATE
DIGITAL SIGNATURE OF TRANSACTION                  606

608
MAJORITY
VALIDATE?          NO          END

YES

ADD TRANSACTION TO BLOCKCHAIN                      610

LOCK DEVICE RETRIEVES CURRENT STATE ON
BLOCKCHAIN AND VALIDATES SIGNATURE                612

MOBILE DEVICE RECEIVES NOTIFICATION OF
TRANSACTION AND DISPLAYS NEW LOCK STATE           614

FIG. 6

BLOCKCHAIN FOR ACCESS CONTROL

CROSS REFERENCE TO RELATED APPLICATIONS

This application is a continuation of U.S. application Ser. No. 17/534,818 filed Nov. 24, 2021 and issued as U.S. Pat. No. 11,962,594, the contents of which are incorporated herein by reference in their entirety.

BACKGROUND

Access control systems often rely on standard server-client relationships for communications over the internet, which allows for point-to-point communications. For example, cloud-based and various other access control systems may store a device twin and/or other virtual representation or data records for each of the access control devices managed by the respective access control system. The access control device may have attributes set in firmware and duplicated in the cloud-based device twin, such that a mobile device can interact with the cloud-based device twin to query the device state and display relevant access control details on a mobile application. However, with denial of service attacks and networking/software errors, it is possible for entire sites/servers to have substantial downtime. Accordingly, it is possible to lose control of access control devices and, therefore, be unable to update or unlock various devices.

SUMMARY

One embodiment is directed to a unique system, components, and methods for using a blockchain in an access control environment. Other embodiments are directed to apparatuses, systems, devices, hardware, methods, and combinations thereof for using a blockchain in an access control environment.

According to an embodiment, a method of using a blockchain in an access control environment may include transmitting, by a mobile device, a request to access a passageway secured by a lock device to a first node device, wherein a plurality of node devices including the first node device store the blockchain, receiving, by the mobile device, a lock-specific access token from one of the plurality of node devices in response to validation of a blockchain transaction associated with the request received from the mobile device by the plurality of node devices, transmitting, by the mobile device, the lock-specific access token to the lock device, receiving, by the mobile device, a verification message from the lock device in response to successful authentication of the lock-specific access token, wherein successful authentication is associated with a grant of access to the passageway, and transmitting, by the mobile device, a notification of verification to the first node device to amend the blockchain.

In some embodiments, validation of the blockchain transaction associated with the request received from the mobile device may include validation of the blockchain transaction by at least a threshold number of node devices.

In some embodiments, validation of the blockchain transaction associated with the request received from the mobile device may include validation of the blockchain transaction by at least a threshold percentage of node devices of a total number of node devices in a blockchain network that includes the plurality of node devices.

In some embodiments, the threshold percentage may be modifiable.

In some embodiments, the method may further include detecting, by the mobile device, a wireless message broadcast by the lock device, and wherein transmitting the request to access the passageway may be in response to detecting the wireless message broadcast by the lock device.

In some embodiments, the wireless message broadcast by the lock device may include a lock identifier of the lock device.

In some embodiments, the request transmitted by the mobile device may include the lock identifier of the lock device and a mobile device identifier of the mobile device.

In some embodiments, the wireless message broadcast by the lock device may be a Bluetooth message.

In some embodiments, the method may further include authenticating, by the lock device, the lock-specific access token received from the mobile device, and granting, by the lock device, access to the passageway in response to successful authentication of the lock-specific access token.

In some embodiments, the one of the plurality of node devices may be the first node device.

In some embodiments, the method may further include requesting, by the first node device, audits from additional nodes of the plurality of node devices in response to validation of the blockchain transaction by the first node device.

In some embodiments, to amend the blockchain may include to write a new lock state of the lock device to the blockchain.

According to another embodiment, a mobile device for using a blockchain in an access control environment may include a processor and a memory comprising a plurality of instructions stored thereon that, in response to execution by the processor, causes the mobile device to transmit a request to access a passageway secured by a lock device to a first node device, wherein a plurality of node devices including the first node device store the blockchain, receive a lock-specific access token from one of the plurality of node devices in response to validation of a blockchain transaction associated with the request received from the mobile device by the plurality of node devices, transmit the lock-specific access token to the lock device, receive a verification message from the lock device in response to successful authentication of the lock-specific access token, wherein successful authentication is associated with a grant of access to the passageway, and transmit a notification of verification to the first node device to amend the blockchain.

In some embodiments, validation of the blockchain transaction associated with the request received from the mobile device may include validation of the blockchain transaction by at least a threshold number of node devices.

In some embodiments, validation of the blockchain transaction associated with the request received from the mobile device may include validation of the blockchain transaction by at least a threshold percentage of node devices of a total number of node devices in a blockchain network that includes the plurality of node devices.

In some embodiments, the plurality of instructions may further cause the mobile device to detect a wireless message broadcast by the lock device, and wherein to transmit the request to access the passageway may include to transmit the request to access the passageway in response to detection of the wireless message broadcast by the lock device.

In some embodiments, the wireless message broadcast by the lock device may include a lock identifier of the lock device.

In some embodiments, the request transmitted by the mobile device may include the lock identifier of the lock device and a mobile device identifier of the mobile device.

According to yet another embodiment, a system for using a blockchain in an access control environment, the blockchain stored on a plurality of nodes devices including a first node device, may include a lock device and a mobile device. The lock device may be configured to control access through a passageway and broadcast a wireless message including a lock identifier of the lock device. The mobile device may be configured to detect the wireless message broadcast by the lock device, transmit a request to access the passageway secured by the lock device to the first node device, the request comprising the lock identifier of the lock device and a mobile device identifier of the mobile device, receive a lock-specific access token from one of the plurality of node devices in response to validation of a blockchain transaction associated with the request received from the mobile device by the plurality of node devices, and transmit the lock-specific access token to the lock device. The lock device may be further configured to authenticate the lock-specific access token, grant access through the passageway in response to successful authentication of the lock-specific access token, and transmit a verification message to the mobile device in response to successful authentication of the lock-specific token. The mobile device may be further configured to transmit a notification of verification to the first node device to amend the blockchain in response to receipt of the verification message from the lock device.

In some embodiments, the lock device may include a first lock device, and the first node device may include a second lock device.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 6 is a simplified flow diagram of at least one embodiment of another method for using a blockchain in an access control environment.

DETAILED DESCRIPTION

Figure 1:
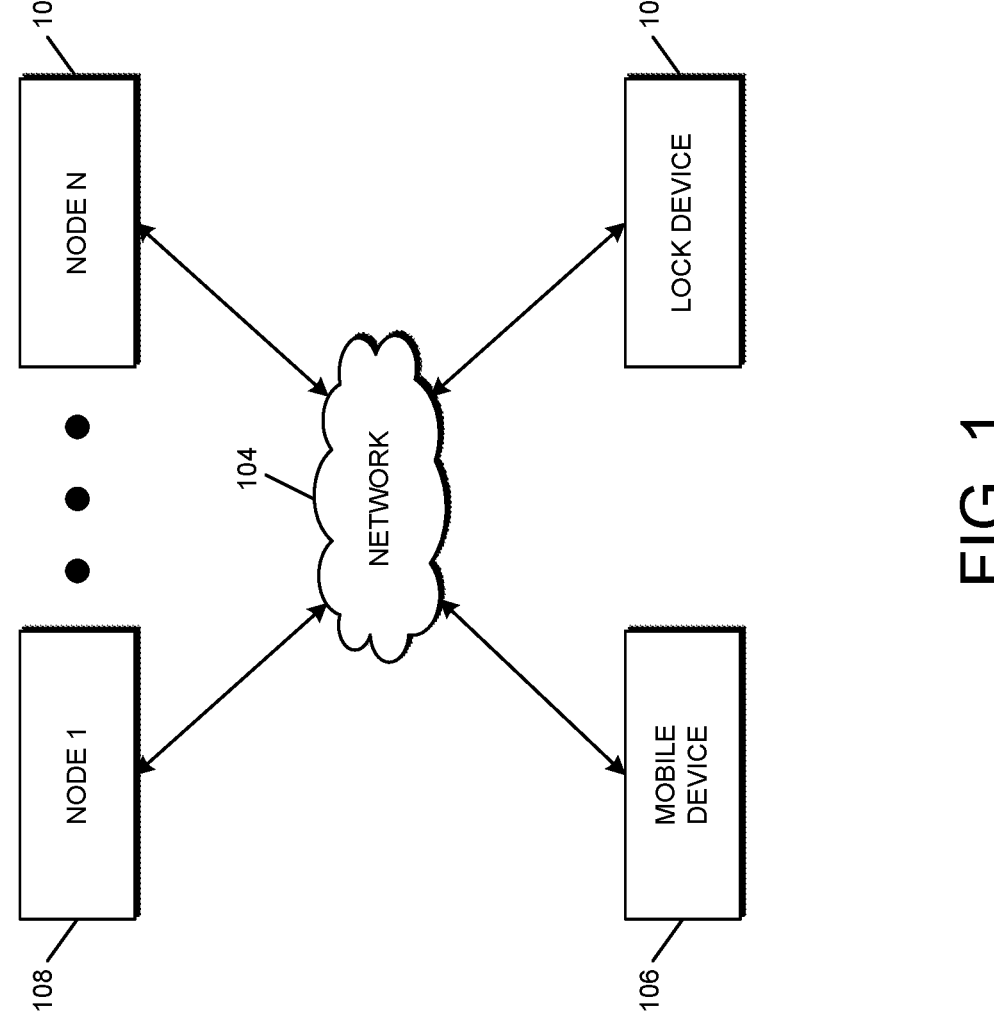
FIG. 1 is a simplified block diagram of at least one embodiment of a system for using a blockchain in an access control environment.
Figure 1:

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for using a blockchain in an access control environment is shown. The illustrative system 100 includes a lock device 102, a network 104, a mobile device 106, and a plurality of node devices 108 (i.e., nodes 1 through N). It should be appreciated that the technologies described herein limit the need to rely on a cloud service provider and limit the potential efficacy of a denial of service attack on the network. By including decision-making and/or auditing in the blockchain, a network of access control devices is no longer tied to any one system's uptime. As described in greater detail below, the system 100 leverages a blockchain stored to a plurality of node devices 108 in order to communicate access control decisions and/or other access control data or interactions. Although only one lock device 102, one network 104, and one mobile device 106 are shown and described in reference to FIG. 1, it should be appreciated that the system 100 may include multiple lock devices 102, networks 104, and/or mobile devices 106 in other embodiments.

It should be appreciated that the lock device 102, the network 104, the mobile device 106, and/or the node devices 108 may be embodied as any type of device or collection of devices suitable for performing the functions described herein. More specifically, in the illustrative embodiment, the lock device 102 may be embodied as any type of device capable of controlling access through a passageway. For example, in some embodiments, the lock device 102 may be embodied as an electronic lock (e.g., a mortise lock, a cylindrical lock, or a tubular lock), gate opener, exit device, auto-operator, garage door opener, or a peripheral controller of a passageway. It should be appreciated that the lock device 102 may include a lock mechanism configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. Depending on the particular embodiment, the lock device 102 may include a credential reader or be electrically/communicatively coupled to a credential reader configured to communicate with the mobile device 106 to receive access credentials.

The lock device 102 may be configured to authenticate various access credentials in order to determine whether a user should be granted access to the passageway secured by the lock device 102. In various embodiments, the lock device 102 may be configured to process passive credentials and/or active credentials depending on the particular embodiment. It should be appreciated that a credential may be "passive" in the sense that the corresponding credential device (e.g., access card) is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, a passive credential may be embodied as a proximity card, which is configured to communicate over a low frequency carrier of nominally 125 kHz, or a smartcard, which is configured to communicate over a high frequency carrier frequency of nominally 13.56 MHz. A credential may be "active" in the sense that the corresponding credential device includes an independent power source (e.g., a battery). For example, the credential may be embodied as a wireless or virtual credential (e.g., BLE credential) stored by a mobile device (e.g., a smartphone) in some embodiments.

The network 104 may be embodied as any type of communication network or connection(s) capable of facilitating communication between the various devices of the system 100. As such, the network 104 may include one or more networks, routers, switches, computers, and/or other intervening devices. For example, the network 104 may be embodied as or otherwise include one or more cellular networks, telecommunication networks, local or wide area networks, publicly available global networks (e.g., the Internet), ad hoc networks, short-range communication links, or a combination thereof. It should be appreciated that the various devices of the system 100 may communicate with one another over different communication protocols and/or different networks 104 depending on the particular embodiment.

The mobile device 106 maybe embodied as any type of mobile device capable of storing an access credential, executing an access control application, and/or otherwise performing the functions described herein. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

Each of the node devices 108 may be embodied as any computing device capable of storing the blockchain and otherwise performing the functions described herein. It should be appreciated that, in some embodiments, one or more of the node devices 108 may be embodied as an access control device (e.g., another lock device) or other device in the same access control environment as the lock device 102. Further, in some embodiments, one or more of the node devices 108 may be embodied as a device outside of the access control environment of the lock device 102. It should be appreciated that the blockchain allows for recording audits in a way that prevents tampering. In particular, the blockchain allows for establishing a record of trust for all transactions using multiple nodes (e.g., node devices 108) to verify a transaction and digitally sign the validity of the audit. The blockchain establishes the current state of the system it is responsible for and maintains a record of all transactions from the beginning of time until the current state. Further, by using the blockchain, there is no single service to bring down. Accordingly, if a single site has downtime (e.g., due to a denial of service attack), the system 100 is still fully operational and can notify the "down site" (e.g., a node device 108 that is down) of the updated ledger when it comes back online. Although the technologies are described herein as leveraging blockchain technologies, it should be appreciated that another type of distributed ledger may be used in other embodiments.

By way of example, suppose a user presents an access credential to a lock device 102. The lock device 102 may ask multiple node devices 108 on the blockchain if the user has access to that lock device 102. The node devices 108 evaluate the request and determine if the user is currently authorized access to the corresponding door and then reply with approval. Once the lock device 102 has confirmed that enough node devices 108 have responded in the affirmative, the lock device 102 grants access through the door, and the audits of all of the relevant transactions are added to the blockchain.

It should be appreciated that each of the lock device 102, the network 104, the mobile device 106, and/or the node devices 108 may be embodied as or include a computing device/system similar to the computing system 200 described below in reference to FIG. 2. For example, in the illustrative embodiment, one or more of the lock device 102, the network 104, the mobile device 106, and/or the node devices 108 may include a processing device 202 and a memory 206 having stored thereon operating logic 208 for execution by the processing device 202 for operation of the corresponding device.

Figure 2:
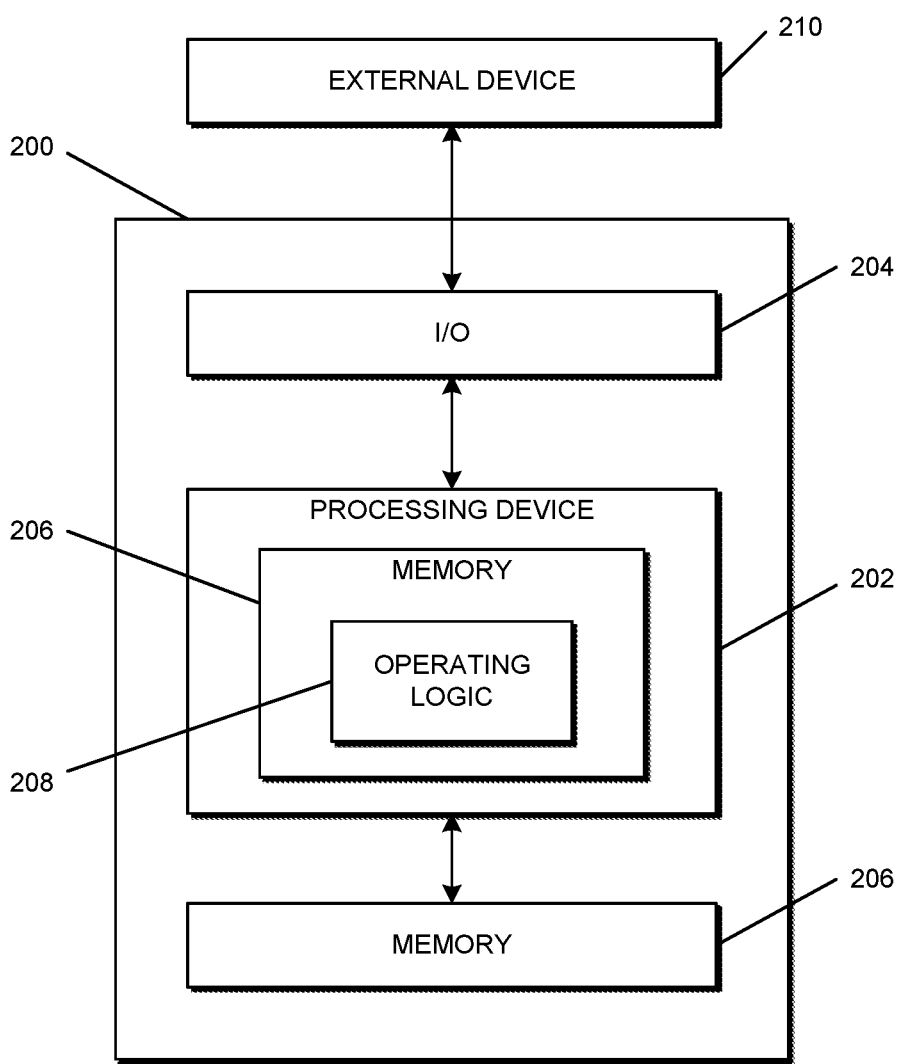
FIG. 2 is a simplified block diagram of at least one embodiment of a computing system.

Referring now to FIG. 2, a simplified block diagram of at least one embodiment of a computing system 200 is shown. The illustrative computing system 200 depicts at least one embodiment of a lock device 102, network 104, mobile device 106, and/or node device 108 illustrated in FIG. 1. Depending on the particular embodiment, computing system 200 may be embodied as a lock device, reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing system 200 includes a processing device 202 that executes algorithms and/or processes data in accordance with operating logic 208, an input/output device 204 that enables communication between the computing system 200 and one or more external devices 210, and memory 206 which stores, for example, data received from the external device 210 via the input/output device 204.

The input/output device 204 allows the computing system 200 to communicate with the external device 210. For example, the input/output device 204 may include a transceiver, a network adapter, a network card, an interface, one or more communication ports (e.g., a USB port, serial port (e.g., RS-232, RS-485, CAN bus), parallel port, an analog port, a digital port, VGA, DVI, HDMI, Fire Wire, CAT 5, or any other type of communication port or interface), and/or other communication circuitry. Communication circuitry of the computing system 200 may be configured to use any one or more communication technologies (e.g., wireless or wired communications) and associated protocols (e.g., Ethernet (e.g., including PoE), Bluetooth® (e.g., including BLE), Wi-Fi®, WiMAX, ZigBee, Z-Wave, NFC, Thread, Matter, etc.) to effect such communication depending on the particular computing system 200. The input/output device 204 may include hardware, software, and/or firmware suitable for performing the techniques described herein.

The external device 210 may be any type of device that allows data to be inputted or outputted from the computing system 200. For example, in various embodiments, the external device 210 may be embodied as the lock device 102, the network 104, the mobile device 106, and/or a node device 108. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing system 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing system 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing system 200 may form a portion of a system-on-a-chip (SoC) and be incorporated on a single integrated circuit chip.

In some embodiments, various components of the computing system 200 (e.g., the processing device 202 and the memory 206) may be communicatively coupled via an input/output subsystem, which may be embodied as circuitry and/or components to facilitate input/output operations with the processing device 202, the memory 206, and other components of the computing system 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 200 may include other or additional components, such as those commonly found in a typical computing device (e.g., various input/output devices and/or other components), in other embodiments. It should be further appreciated that one or more of the components of the computing system 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing system 200 may include multiple processing devices 202, I/O devices 204, and/or memories 206 in other embodiments. Further, in some embodiments, more than one external device 210 may be in communication with the computing system 200.

Figure 3:
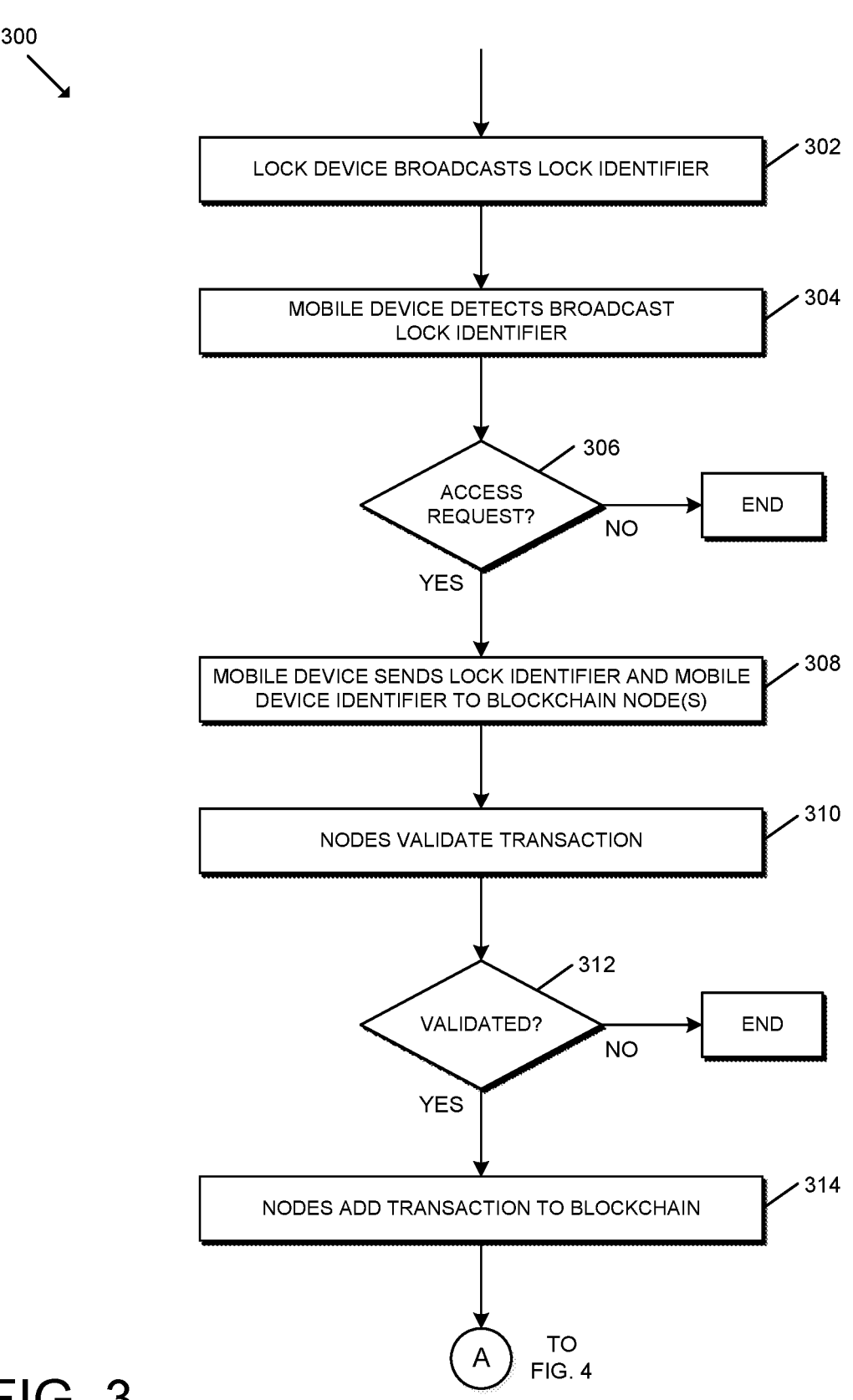
FIGS. 3-4 are a simplified flow diagram of at least one embodiment of a method for using a blockchain in an access control environment.
Figure 4:
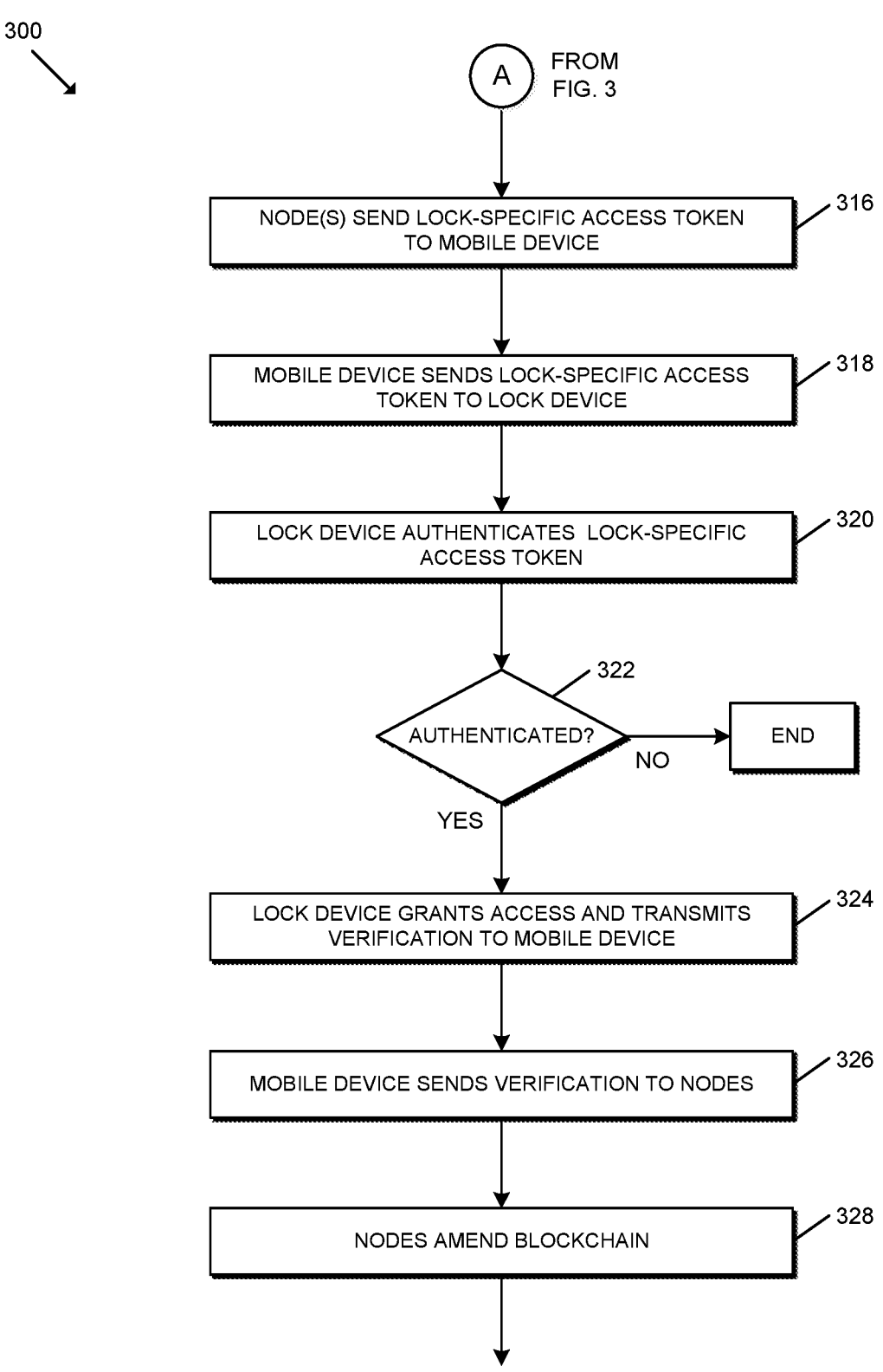

Referring now to FIGS. 3-4, in use, the system 100 may execute a method 300 for using a blockchain in an access control environment. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 of FIG. 3 in which the lock device 102 broadcasts a wireless message indicating its presence. For example, the lock device 102 may engage in proximity marketing of its location via a localized broadcast of the wireless message. In the illustrative embodiment, the lock device 102 broadcasts a Bluetooth (e.g., BLE) advertisement message; however, it should be appreciated that the lock device 102 may utilize another suitable wireless communication technology to broadcast the wireless message in other embodiments. In the illustrative embodiment, the broadcast wireless message includes a lock identifier that identifies the lock device 102 (e.g., uniquely). However, it should be further appreciated that the content of the wireless message may vary depending on the particular embodiment.

In block 304, the mobile device 106 detects the wireless message broadcast by the lock device 102 (e.g., due to the mobile device 106 being within wireless communication range of the lock device 102). For example, in some embodiments, the mobile device 106 discovers the Bluetooth (e.g., BLE) advertisement message broadcast by the lock device 102 (e.g., including the lock identifier of the lock device 102 and/or other data in the advertisement message).

In block 306, if the mobile device 106 determines to request access to the passageway secured by the lock device 102, the method 300 advances to block 308 in which the mobile device 106 sends a request (e.g., as an access control request message) to access the passageway secured by the lock device 102 to one or more node devices 108 of the system 100 (i.e., nodes that include the blockchain). In the illustrative embodiment, the request includes the lock identifier of the lock device 102 and also a mobile device identifier that identifies the mobile device 106 (e.g., uniquely). However, it should be further appreciated that the content of the request message may vary depending on the particular embodiment. Additionally, the number of node devices 108 that the request message is transmitted to may vary depending on the particular embodiment. For example, in some embodiments, the initial request message may be transmitted to a single node device 108, which may forward the message to other node devices 108 for auditing and/or validation. Although the request is described herein as a request to access the passageway secured by the lock device 102, it should be appreciated that the request may be associated with another type of access control request and/or interaction (e.g., firmware update, configuration, audit, etc.).

In block 310, the node devices 108 validate a blockchain transaction associated with the request received from the mobile device 106. In doing so, the node devices 108 determine whether the access request is a valid transaction. Further, in validating the blockchain transaction, the node devices 108 may also determine whether the mobile device

106 is authorized access to the passageway secured by the lock device 102 (and/or authorized to perform another type of access control request and/or interaction in such other embodiments) based on the lock identifier and the mobile device identifier received from the mobile device 106 (directly or indirectly). Accordingly, it should be appreciated that, in some embodiments, the node devices 108 may be configured to access an access control database and/or otherwise be capable of determining whether the mobile device 106 should be granted permission based on the identifiers and/or other relevant access control data.

If, in block 312, the transaction has been validated, the method 300 advances to block 314 in which the node devices 108 add the transaction to the blockchain (e.g., as stored in each of the blockchains stored on the respective node devices 108). It should be further appreciated that, in some embodiments, overall validation of the blockchain transaction may require that at least a threshold number of the node devices 108 validate the transaction. In another embodiment, overall validation of the blockchain transaction may require that at least a threshold percentage of node devices 108 of a total number of node devices in a blockchain network associated with the access control environment validate the transaction (e.g., 51%, 85%, 90%, etc.). Further, in some embodiments, the threshold percentage required for overall validation of the transaction may be modifiable by an administrator and/or authorized user of the system 100 to "dial up" or "dial down" the associated security.

In block 316 of FIG. 4, one or more of the node devices 108 generate a lock-specific access token that may be used to grant access to the lock device 102, and the node device(s) 108 send the lock-specific access token to the mobile device 106. For example, in some embodiments, the node device 108 to which the mobile device 106 transmitted the request to access the passageway provides the lock-specific access token to the mobile device 106. However, in other embodiments, one or more additional or alternative node devices 108 may transmit the lock-specific access token to the mobile device 106. It should be appreciated that the lock-specific access token may be embodied as any type of data and/or data structure capable of being transmitted from the mobile device 106 to the particular lock device 102 in order for the lock device 102 to evaluate the lock-specific access token and grant access upon confirmation of its authenticity.

In block 318, the mobile device 106 sends the lock-specific access token to the lock device 102 to request access to the passageway secured by the lock device 102 (or to perform another relevant access control interaction in such embodiments). In block 320, the lock device 102 authenticates the lock-specific access token received from the mobile device 106. As indicated above, in the illustrative embodiment, the node devices 108 evaluate the relevant data (e.g., lock identifier and mobile device identifier) to determine whether the mobile device 106 should be authorized to access the passageway and/or otherwise interact with the lock device 102. Accordingly, in such embodiments, the access control decision is performed by the node devices 108, and the lock device 102 may, therefore, authenticate the lock-specific access token, for example, by simply confirming the authenticity of the token. In other words, in some embodiments, the lock device 102 may simply confirm that the lock-specific access token is a true and accurate access token associated with that particular lock device 102. In other embodiments, however, it should be appreciated that the lock device 102 may perform additional authentication. For example, the lock device 102 may leverage one or more multi-factor authentication techniques, one factor of which involves authenticating the lock-specific access token.

If the lock device 102 successfully authenticates the lock-specific access token in flow 322, the method 300 advances to block 324 in which the lock device 102 grants access to the passageway secured by the lock device 102 and sends a verification message to the mobile device 106 indicating that access has been granted. In block 326, the mobile device 106 sends a notification of the verification (and/or forwards the verification message itself) to one or more node devices 108. For example, in some embodiments, the mobile device 106 may transmit the notification to the node device 108 to which the mobile device 106 initially transmitted the request to access the passageway. However, in other embodiments, the mobile device 106 may transmit the notification to one or more additional or alternative node devices 108. Further, as described above, the node devices 108 may forward the notification to other node devices 108 to audit the transaction.

In block 328, the node devices 108 amend the blockchain based on the received notification (e.g., indicating that the lock device 102 granted access to the mobile device 106). Accordingly, it should be appreciated that the blockchain serves as a permanent audit trail for interactions with access control devices within the system 100. It should be further appreciated that the node devices 108 may periodically determine consensus across the blockchains stored in the respective node devices 108 using any suitable blockchain consensus technologies.

Although the blocks 302-328 are described in a relatively serial manner, it should be appreciated that various blocks of the method 300 may be performed in parallel in some embodiments. Additionally, although not described in significant detail, it should be appreciated that, depending on the particular embodiment, the communication among the various devices of the system 100 may involve encryption, decryption, signatures, certificates, and/or other cryptographic techniques to secure the communication therebetween.

Figure 5:
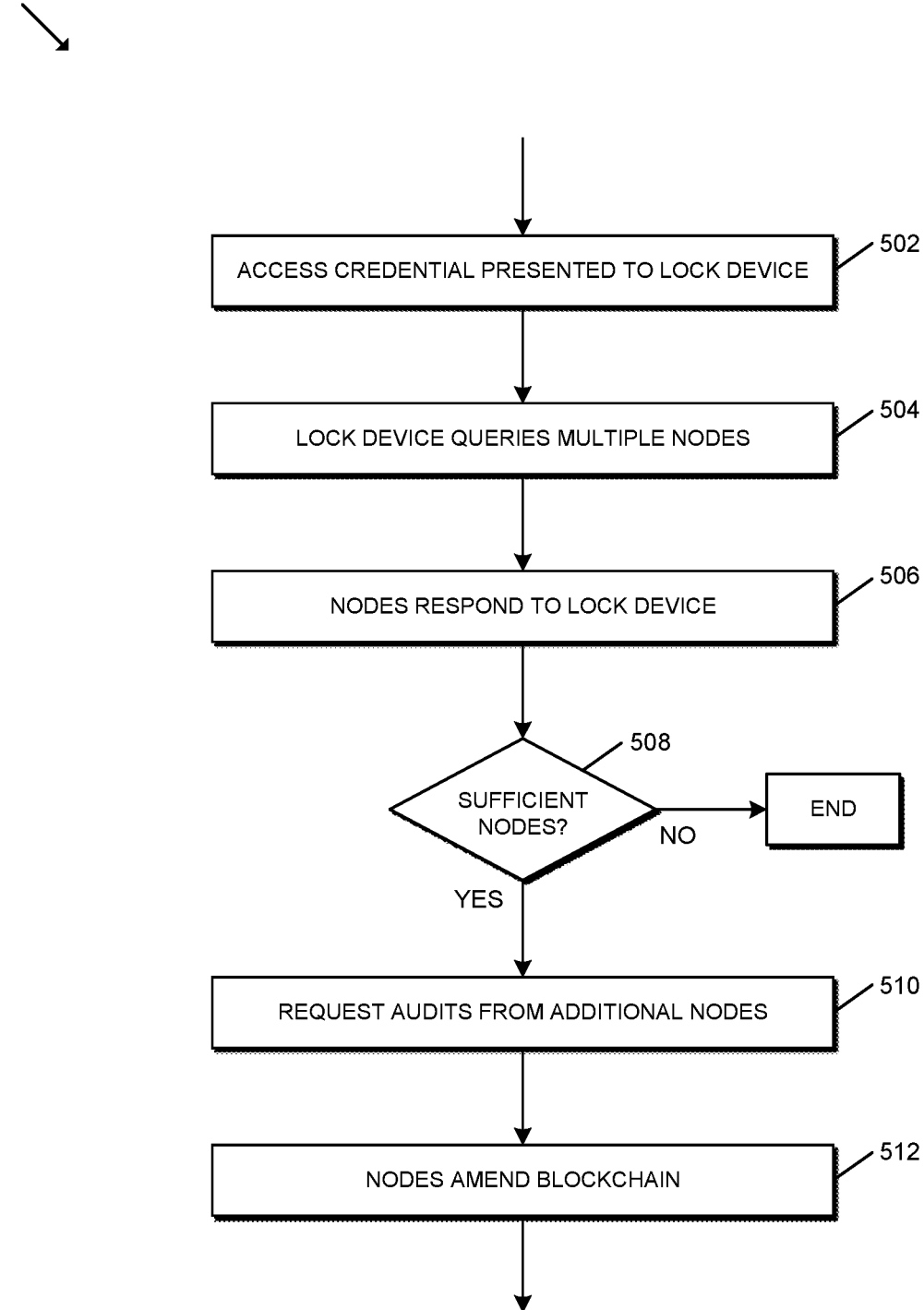
FIG. 5 is a simplified flow diagram of at least one embodiment of a method for using a blockchain for access control and auditing.

Referring now to FIG. 5, in use, the system 100 may execute a method 500 for using a blockchain for access control and auditing. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which an access credential is presented to the lock device 102. It should be appreciated that the credential may be a passive credential (e.g., smart card or proximity card) or an active credential (e.g., BLE credential or NFC credential) depending on the particular embodiment. In block 504, the lock device 102 queries multiple node devices 108 to make an access control decision on behalf of the lock device 102. In doing so, it should be appreciated that the lock device 102 may transmit relevant access control and/or credential data to the node devices 108 for evaluation. In block 506, one or more of the node devices 108 respond to the lock device 102 (e.g., individually granting or denying access to the lock device 102 based on their respective evaluation of the queries).

In block 508, if a sufficient number of node devices 108 have responded to the lock device 102, the method 500 advances to block 510 in which lock device 102 requests audits from additional node devices 108 in the blockchain network. It should be appreciated that the number of node devices 108 required to respond to the lock device 102 may vary depending on the particular embodiment and, in some embodiments, may be modifiable by an administrator or authorized user of the system 100 as described above. In block 512, the node devices 108 amend (e.g., write to) the blockchain based on the grant/denial of access.

Although the blocks 502-512 are described in a relatively serial manner, it should be appreciated that various blocks of the method 500 may be performed in parallel in some embodiments. It should be appreciated that the method 500 illustrates that, in some embodiments, the lock device 102 may communicate with the node devices 108 rather than the mobile device 106.

Referring now to FIG. 6, in use, the system 100 may execute a method 600 for using a blockchain in an access control environment. It should be appreciated that the particular blocks of the method 600 are illustrated by way of example, and such blocks may be combined or divided, added or removed, and/or reordered in whole or in part depending on the particular embodiment, unless stated to the contrary.

The illustrative method 600 begins with block 602 in which the mobile device 106 sends a lock state update to the lock device 102 (e.g., unlock/lock). In block 604, the transaction to update the lock state is inspected by the node devices 108 of the blockchain network to ensure that the update originated from a trusted source. As described above, it should be appreciated that, in some embodiments, other lock devices in the access control environment may themselves constitute the node devices 108. In block 606, other lock devices (e.g., node devices 108) on the network (e.g., in the access control environment) validate the digital signature of the transaction and confirm that the signature matches the signature on the original transaction.

In block 608, if a majority of the node devices 108 (e.g., other lock devices) validate that the transaction is an authorized transaction, the method 600 advances to block 610 in which the transaction is added to the blockchain. In block 612, the lock device 102 retrieves the current state of the lock device 102 stored on the blockchain and validates the digital signature. In block 614, the mobile device 106 receives a notification of the approved transaction and displays the new lock state on a graphical user interface of the mobile application. It should be appreciated that these techniques can continue for all access control system users. The blockchain continues to grow as records of lock states and user access attempts are recorded and anonymously maintained in the blockchain (e.g., where all user data may be encrypted, obscured, and fully anonymized).

Although the blocks 602-614 are described in a relatively serial manner, it should be appreciated that various blocks of the method 600 may be performed in parallel in some embodiments.

What is claimed is:

1. A method of using a blockchain in an access control environment, the method comprising:
   broadcasting, by a lock device, a Bluetooth advertisement message including a lock identifier of the lock device;
   detecting, by a mobile device, the Bluetooth advertisement message broadcast by the lock device;
   transmitting, by the mobile device and to a first node device of a plurality of node devices of a blockchain network, a request to perform a lock interaction with respect to the lock device in response to detecting the Bluetooth advertisement message broadcast by the lock device, wherein the request includes the lock identifier of the lock device and a mobile device identifier of the mobile device;

validating, by the first node device, a blockchain transaction associated with the request received from the mobile device;

generating, by the first node device, a lock-specific token that grants authorization to perform the lock interaction with respect to the lock device in response to validation of the blockchain transaction by at least one of the plurality of node devices of the blockchain network;

transmitting, by the first node device, the lock-specific token to the mobile device;

receiving, by the first node device and from the mobile device, a notification of verification in response to successful authentication of the lock-specific token by the lock device; and amending the blockchain by the first node device in response to receiving the notification of verification.

2. The method of claim 1, wherein validation of the blockchain transaction comprises validation of the blockchain transaction by at least a threshold number of node devices of the plurality of node devices.

3. The method of claim 1, wherein validation of the blockchain transaction comprises validation of the blockchain transaction by at least a threshold percentage node devices of a total number of node devices in the blockchain network.

4. The method of claim 3, wherein the threshold percentage is modifiable.

5. The method of claim 1, further comprising requesting, by the first node device, audits from additional node devices of the plurality of node devices in response to validating the blockchain transaction.

6. The method of claim 1, wherein amending the blockchain comprises writing an indication of grant of access by the lock device to the mobile device to the blockchain.

7. The method of claim 1, wherein the first node device comprises an access control device different from the lock device.

8. The method of claim 1, wherein validation of the blockchain transaction comprises validation of the blockchain transaction by the plurality of node devices of the blockchain network.

9. The method of claim 1, wherein the request to perform the lock interaction comprises an access control request.

10. The method of claim 1, wherein the request to perform the lock interaction comprises a request to perform a firmware update on the lock device.

11. The method of claim 1, wherein the request to perform the lock interaction comprises a request to update a configuration of the lock device.

12. The method of claim 1, wherein the first node device is an access control device within an access control environment of the lock device.

13. The method of claim 1, further comprising receiving, by the mobile device, the lock-specific token from the first node device and from at least one other node device of the of the plurality of nodes devices of the blockchain network.

14. The method of claim 1, wherein amending the blockchain comprises writing a new lock state of the lock device to the blockchain.

* * * * *